United States Patent Office 3,111,362
Patented Nov. 19, 1963

---

3,111,362
NOVEL CROSS-LINKED POLYMERS, FIBROUS PRODUCTS, AND METHODS OF MAKING THEM
Fabian T. Fang, Levittown, and Guy C. Murdoch, Wycombe, Pa., assignors to Rohm & Haas Company, Philadelphia, Pa., a corporation of Delaware
No Drawing. Filed May 11, 1960, Ser. No. 28,242
12 Claims. (Cl. 8—115.5)

The present invention is concerned with the production of novel cross-linked polymers and filaments and fibers comprising polymeric components oriented longitudinally of the axis of the fibers therein. The invention is particularly concerned with artificial fibers formed of polymerized monovinyl aromatic compounds. More particularly, the invention is concerned with fibers of polymerized monovinyl aromatic compounds stabilized against shrinkage on heating. The invention is also concerned with the production of ion-exchange fibers formed of sulfonated vinyl aromatic compounds which are not subject to excessive swelling or shrinking in aqueous media.

In accordance with the present invention, the cross-linked polymer comprises, or the cross-linked fiber is formed from, either (1) a blend of (A) a polymer of a monovinyl aromatic compound, the aromatic nucleus of which has at least two substitutable positions, with (B) a linear polymer of at least one acyl member selected from the group consisting of monoethylenically unsaturated acids and the halides, anhydrides, nitriles, and esters of such acids, or (2) an aryl/acyl copolymer (C) comprising polymerized units of at least one monovinyl aromatic compound as defined above with at least one acyl member of the group defined above. The $T_1$ of the blend or of the copolymer should be at least 20° C. and it may be from 20° to 100° C. or more. The $T_1$ value referred to is the apparent second order transition temperature or inflection temperature which is found by plotting the modulus of rigidity against temperature. A convenient method for determining modulus of rigidity and transition temperature is described by I. Williamson, British Plastics 23, 87–90, 102 (September 1950). The $T_1$ value here used is that determined at 300 kg./cm.².

Component (A) may be a homopolymer of a compound having the formula

$$H_2C=C(R)Z$$

wherein R is hydrogen or an alkyl group advantageously of less than 3 carbon atoms and Z is an aryl group which has positions on an aromatic nucleus available for substitution. The formula includes vinyl aryls, such as styrene, vinyl naphthalene, vinyl diphenyl, vinyl fluorene, etc., and their nuclear-substituted derivatives, such as alkyl, aryl, alkaryl, aralkyl, cycloalkyl, alkoxy, aryloxy, chloro, fluoro, chloromethyl, fluoromethyl, and trifluoromethyl nuclear derivatives, for example, methyl-styrenes, e.g., o, m, and p-methyl-styrenes, o, m, and p-ethyl styrenes, isopropyl-styrenes, tolyl-styrenes, benzyl-styrenes, cyclohexyl-styrenes, methoxy-styrenes, phenoxy-styrenes, o, m, and p-chlorostyrenes, o, m, and p-fluorostyrenes, chloromethyl-styrenes, fluoromethyl - styrenes, trifluoromethyl-styrenes, vinyl-methylnaphthalenes, vinyl-ethyl-naphthalenes, vinyl-chloro-naphthalenes, vinyl-methyl-chloro-naphthalenes, etc. The polymerizable monomers which can be used advantageously with ionic type catalysts include aromatic compounds having a vinyl group containing an alkyl group in its alpha-position, e.g., isopropenyl or alpha-methyl-vinyl, alpha-ethyl-vinyl, alpha-propyl-vinyl, etc. Such alpha-alkyl-vinyl groups may be substituted on benzene, naphthalene, diphenyl, fluorene nuclei, etc., and may have other substituents on the aromatic nuclei as illustrated above for the vinyl aryl compounds.

If desired, the acyl/aryl copolymer or a polymer in the blend may also comprise units of an alkenyl halide or of a linear aliphatic polyene in which event the cross-linking by acylation may be supplemented by cross-linking formed by alkylation of the aryl nuclei by the alkenyl halide or polyene. The alkenyl halides that may be so employed include methallyl chloride, allyl chloride, 2,3-dichloro-propene-1, crotyl chloride, vinyl chloride, vinylidene chloride, 1-chloro-1-fluoro-ethylene, and 4-chlorobutene-1, pentenyl-chlorides. Examples of polyenes are butadiene-1,3; isoprene or 2-methyl-butadiene-1,3; 2,3-dimethyl-butadiene-1,3; 2-methyl-pentadiene-1,3; hexatriene-1,3,5; myrcene; ocimene; allo-ocimene, etc., and certain substituted aliphatic polyenes such as chloro, fluoro, and aryl derivatives, e.g., chloroprene or 2-chloro-butadiene-1,3; fluoroprene or 2-fluoro-butadiene-1,3; and 1-phenylbutadiene-1,3.

Examples of acyl compounds that may be polymerized to form component (B) of the blend or copolymerized with an aryl compound of the formula $CH=C(R)Z$ above to form the aryl/acyl copolymer include acrylic acid, methacrylic acid, maleic acid, fumaric acid, crotonic acid, itaconic acid, aconitic acid, citraconic acid, acrylyl chloride, methacrylyl chloride, esters of any of the above acids with an alcohol having from 1 to 18 carbon atoms, especially of the $C_1$–$C_{18}$ alkanols, cyclohexanol, benzyl alcohol, and isobornyl alcohol, such as methyl, ethyl, butyl, 2-ethylhexyl, dodecyl, or octadecyl acrylate or methacrylate, and diethyl maleate or fumarate. Preferred esters are those containing a tertiary alkyl group in the moiety derived from the alcohol such as t-butyl, t-octyl, and t-dodecyl acrylate or methacrylate, because of the ease with which these acylate the aryl nuclei. Another preferred group of esters are those containing a $C_2$ to $C_{19}$ alkoxymethyl group in the alcohol moiety, such as methoxymethyl or ethoxymethyl acrylate or methacrylate. Acrylonitrile and methacrylonitrile are also useful.

The polymer of component (A) in the blend may be a copolymer of one or more of the monovinyl aromatic compounds above. Also, the polymer of component (A) may comprise up to 50% by weight of a non-aromatic monoethylenically unsaturated compound copolymerized therein. Examples of such non-aromatic compounds include isobutylene, ethylene, vinyl acetate, acrylonitrile, methyl methacrylate, ethyl acrylate, or other acrylic esters.

Component (B) may comprise copolymers of one or more of the acyl members with up to 90% by weight of one or more of the aromatic compounds mentioned hereinabove or it may include up to 50% by weight of any other type of comonomer such as isobutylene, ethylene, vinyl acetate, acrylonitrile, or acrylamide.

The polymers making up components (A) and (B) and the copolymers (C) may have any molecular weight from 10,000 up to 10,000,000. However, it is preferred to employ polymers having molecular weights of 300,000 or higher. The polymers or copolymers may be produced by any suitable polymerization system, such as bulk, solution, emulsion, or suspension. Component (A) and component (B) may be mixed or blended by mixing molten masses of the two polymer components, by mixing polymer solutions, or by mixing the aqueuos dispersions obtained by emulsion polymerization.

The proportion of component (B) in the blended polymer mass formed of (A) and (B) is such as to provide an amount of acyl units between about 2 and 30% by weight of the entire polymer weight in the blended polymer mass. A similar proportion of acyl units should be available in copolymers (C). Preferably, the amount of acyl units is in the range of 5 to 20% by weight of the polymerized mass making up the aryl/acyl copolymer of the blend.

The aryl/acyl blended polymers may be formed into fibers in any suitable way such as by extruding a molten mixture into an atmosphere having a controlled temperature and especially a temperature substantially below the melting point of the mixture.

The fibers may be formed by extruding solutions of the aryl/acyl copolymer or the polymer blend in an organic solvent or mixture thereof into a coagulating medium which may be a heated or cooled atmosphere in the case of a dry spinning system, or a liquid coagulating bath in the case of a wet spinning system. An aqueous dispersion of aryl/acyl copolymer or a blend of emulsion polymers may likewise be spun in either a dry or wet spinning system. In a wet spinning system, the coagulating bath is composed of a liquid medium which is not a solvent for the aryl/acyl copolymer or the polymer blend but is a solvent for the solvent that is used in making the solution or dispersion of the polymer that is spun. In the spinning operation by dry or wet spinning, the aryl/acyl copolymer of the polymer blend is subjected to an operation for effecting complete coalescence. This may involve simply the maintenance of a sufficiently high temperature in the coagulating media or it may involve a separate step thereafter in which the partially coalesced aryl/acyl copolymer or the polymer blend is completely coalesced by heat. The temperature for this purpose may be from 60° to 400° C. depending upon the particular aryl/acyl copolymer or the polymer blend to be coalesced.

After coalescence of the aryl/acyl copolymer or the polymer blend into the fiber form, it is desirable to subject the filament or fiber to stretching. This stretching may be from 50% to several thousand percent of the initial length obtained after coalescence. This stretching may be facilitated by carrying it out on the filaments while subjected to a temperature in the range of 40° to 120° C.

After stretching, the filaments may be converted into various textile or industrial fabric structures. This may involve assembly of a large multiplicity thereof into the form of an untwisted tow, the assembly of a multiplicity of the filaments into a twisted yarn, the doubling of several yarns of the filaments into a thread, cord, or the like, the formation of the fabrics from the yarns by interlocking thereof as by weaving, knitting, netting, knotting, or braiding, or the formation of felted or non-woven fabrics.

The artificial fibers or filaments, after stretching and either before or after conversion into any of the fabricated structures just mentioned, are stabilized by reacting aryl groups of the aryl/acyl copolymer or of the polymer (A) in the blend with acyl groups of the aryl/acyl copolymer or of the polymer (B) in the blend. This reaction involves cross-linking by an acylation of aryl groups of the aryl/acyl copolymer or of the polymer (A) by the acyl units in the aryl/acyl copolymer or the polymer (B). This acylation cross-linking action may be effected by the use of Lewis acids or Friedel-Crafts catalysts such as aluminum chloride, ferric chloride, stannic chloride, titanium chloride, the corresponding bromides such as aluminum bromide and so forth, and boron trifluoride, especially its complexes such as with ethyl ether. Instead of the catalysts just mentioned, the acylation can be effected simply by treatment with strong acids such as sulfuric acid, phosphoric acid, chloro-sulfonic acid, alkyl or aromatic sulfonic acids such as o- or p-toluenesulfonic acid, or methanesulfonic acid, and polyphosphoric acid.

The treatment with the Lewis acid catalysts may be effected in solvents such as nitromethane when such catalysts are of solid character; but when the liquid form such as the boron trifluoride ethyl ether complex is employed, no solvent need be used though if desired, a suitable solvent may be employed. In this procedure of operation, when a solvent is employed, the tendency of the fibers to shrink in the solvent can be substantially completely prevented by employing the Lewis acid catalyst at a very high concentration therein or if desired, by holding the fibers under tension during treatment. By winding the filaments or yarns tightly on a bobbin or porous core and then treating with the catalyst, the winding serves to maintain the tension. The necessity to hold the fibers under tension is practically eliminated when concentrations of the catalyst in the neighborhood of 1 molar or higher are used.

The temperature of treatment may range from about 0° C. to about 100° C. when the Lewis acid catalyst is employed. In general, the time of treatment varies inversely with the temperature and it may range from about 1 to 5 minutes to 2 hours at the higher temperature above and 1 to 72 hours at the lower temperature. The treatment can be allowed to proceed for longer times than specified.

In the case of employing strong acids, such as the commercial 96% by weight, sulfuric acid, temperatures may range from about 0° to 35° C. In the case of sulfuric acid, the concentration may vary from 70 to 103%. The time of treatment may vary from about 1 to 72 hours at about 20° C. depending upon the denier of the fiber, the finer the fiber the shorter the time needed to provide effective cross-linking and stabilization. At 0° C. a minimum period of about 2 hours is generally needed to effect adequate cross-linking. Temperatures higher than 35° C. should be avoided since above that temperature sulfonation is favored which leads to swelling and dissolution of the fiber before crosslinking is adequately performed. With proper control of the temperature to prevent too rapid sulfonation, the treatment may be allowed to proceed for 3 or 4 days without causing shrinkage or dissolution of the fiber during the treatment.

The acylation may be effected by the employment of any of the other strong acids mentioned at relatively high concentrations in aqueous media. Concentrations of 70 to 98% may be used.

In general, the same range of temperature may be employed as in the case of sulfuric acid. Similar time periods are generally applicable as well.

Termination of the acylation treatment may be effected by immersion of rinsing in water. If desired, the first rinsing may be effected with a less concentrated solution of the acid employed during the acylation and such rinsing may be carried out in successive stages of increasing dilution followed finally with one or more rinses in water.

After the acylation just described by which the artificial fiber is stabilized against shrinkage, it may be subjected to a sulfonation reaction. This can be a continuation of the acylation treatment when that is done by means of sulfuric acid or one of the strong sulfonic acids mentioned hereinabove and such continuation may be carried out at temperatures of from about 20° C. up to about 100° C.

If desired, the sulfonation may involve the addition of a more strongly acting sulfonating agent than the sulfuric acid employed during the cross-linkage stage. Thus, oleum may be added to the sulfuric acid bath in stages. This extended sulfonation may be carried out at room temperature or up to 100° C. or even as low as 0° C. The time depends upon the temperature and the particular sulfonating agent. Chlorosulfonic acid is extremely rapid in its action even at 0° C. When sulfur trioxide is employed as a sulfonating agent, a solvent such as dioxane may be employed.

The extended treatment with sulfuric acid or fuming sulfuric acid may be accelerated by the employment of catalysts such as silver sulfate.

When the acylation is effected by means of a Lewis acid or of a phosphoric acid or other strong acid other than a sulfonating type, it is merely necessary to add a sulfonating agent with or without such a catalyst as silver sulfate to the cross-linking bath to effect the sulfonation.

When the desired extent of sulfonation has been effected, the fibers or fibrous product is removed from the sulfonating bath and washed or rinsed. This may desirably be effected by treatment with one or more increasingly dilute sulfuric acid or other sulfonating acid solutions in water. Then, the treated fabric may be finally washed and if desired, neutralized in an aqueous alkaline solution.

By the procedure of the present invention, ion-exchange fibers and fabrics of many types may be obtained which are highly sulfonated and useful for ion-exchange purposes in well-known ways and yet are not subject to excessive swelling or shrinkage in aqueous media during use as ion-exchangers. They may be made into endless belts for use in continuous ion-exchange systems. The extent of sulfonation may be anywhere from 0.1 to 3 sulfonic acid groups per aromatic nucleus. Preferred products generally contain an average of about one sulfonic acid group per aromatic nucleus. The ion-exchange capacity may range from about 0.5 milliequivalent per gram to 6 or more milliequivalents per gram. Preferred products have ion-exchange capacity from 3 to 5 milliequivalents per gram.

While the description herein refers primarily to the production of fibers or filaments, it is also applicable to the treatment of films and pellicles as well.

In the following examples, the parts and percentages are by weight unless otherwise indicated.

The following Example A is a typical procedure by which stretched fibers of a polymer blend adapted to be converted into the stabilized, sulfonated products of the present invention may be made.

Example A

Two emulsion polymers are prepared in aqueous dispersions using 3% potassium laurate based on solids in each case, the first being polystyrene and the second poly(ethyl acrylate) both at 40% polymer solids by weight. The two dispersions are blended in an 80:20 styrene-to-ethyl acrylate-weight ratio and 5% toluene based on polystyrene solids is gradually added with stirring. The dispersion blend is forced at a rate of 36.7 grams per minute through a platinum-alloy spinneret into a coagulating bath. The spinneret has a face diameter of 0.5 inch and contains 524 holes each of 0.0025 inch diameter. The coagulating bath is an aqueous 30% hydrochloric acid solution also containing 0.5% p-diisobutylphenoxyethoxyethyl dimethyl benzyl ammonium chloride and is maintained at 85° C. The bundle of filaments formed is drawn through the bath at a rate of about eleven meters per minute. The immersion path is four inches. The yarn is washed on a roll immersed in a trough fed by fresh water and equipped with an overflow pipe. The yarn is then dried by passing it over two canted heated drums revolving at a speed providing a linear peripheral rate of about 11 meters per minute. The temperature of the drums is 230° C. The yarn is then passed over rolls operating at differential speeds to stretch the yarn about 400%. The first of these two rolls is heated to about 120° C. The stretched yarn is collected on a bobbin winder. It has a denier of about 1400, a tenacity of 0.9 gram per denier, and an extensibility of 25% at break.

Aqueous dispersions of copolymers may be spun in similar fashion. The fiber formed of a copolymer of 90% styrene and 10% of acrylyl chloride in Example 12 may be produced by melt-spinning the copolymer or dry-spinning a 20% solution of the copolymer in toluene into an atmosphere of air, nitrogen, or carbon dioxide, at a temperature of 100° to 120° C.

Example 1

Filaments of a copolymer of about 90% of styrene and 10% of methacrylic acid by weight (having a $T_i$ well above 20° C.) which have been oriented by stretching about 80% are immersed in a 1.0 molar solution of aluminum chloride in nitromethane at ambient temperatures for 24 hours. The treated filaments are rinsed thoroughly with water and air-dried. The resulting fiber is cross-linked as evidenced by its insolubility in common organic solvents including toluene, xylene, and chlorobenzene.

Example 2

The stretched styrene-methacrylic acid copolymer filaments in Example 1 are immersed in 96% sulfuric acid at 25° C. for 24 hours. The treated fiber is rinsed thoroughly with water and then air-dried. The product is insoluble in common organic solvents including toluene, xylene, and chlorobenzene, and is resistant to shrinkage by heating. It also has a small cation-exchange capacity in the form of sulfonic acid functional groups.

Example 3

Filaments (stretched 600%) of a copolymer, having a $T_i$ well above 20° C., of about 90% of styrene and 10% of methoxymethyl methacrylate by weight are immersed in 96% sulfuric acid at room temperature for 24 hours. The treated filaments are rinsed thoroughly with water and air-dried. The resulting fiber is insoluble in toluene with a lateral swelling ratio of only 5%.

Example 4

Filaments (stretched 300%) of a copolymer, having a $T_i$ well over 20° C., of about 85% of styrene and 15% of methoxymethyl methacrylate by weight are immersed in 96% sulfuric acid at 25° C. for 24 hours. The treated filaments are washed thoroughly with water and air-dried. The resulting fiber becomes cross-linked and is insoluble in common organic solvents including toluene, xylene, and chlorobenzene.

Example 5

Filaments (stretched 800%) of a copolymer, having a $T_i$ well over 20° C., of about 90% of styrene and 10% of tertiarybutyl acrylate, by weight, are immersed in 96% sulfuric acid at ambient temperatures for 24 hours. The treated filaments are rinsed with water and air-dried. The product is insoluble in toluene, xylene, and chlorobenzene, but swells therein.

Example 6

Filaments (stretched 500%) of a fiber composed of a blend (having a $T_i$ value over 20° C.) of polystyrene (50% by weight) and a copolymer of styrene (58.4% by weight) and acrylonitrile (41.6% by weight) are soaked in 96% sulfuric acid at 35° C. for 73 hours. This treated fiber is quenched in 85% sulfuric acid, then washed in water, 20% sodium hydroxide and water again. The white product is thus stabilized by cross-linking and retains its fiber structure. The stabilized fiber is insoluble in dimethylformamide.

Example 7

The fiber described in Example 7 is soaked in 96% sulfuric acid at 35° C. for 4 hours. It is quenched and washed in the same manner and is shown to be stabilized by the negative solubility in dimethylformamide.

Example 8

Filaments (stretched 400%) composed of a blend (having a $T_i$ well over 20° C.) of poly(styrene) (80% by weight) and poly(ethyl acrylate) (20% by weight) are stabilized by soaking in 96% sulfuric acid at 35° C. for 24 hours. The white fiber product is quenched by immersion in 85% sulfuric acid, then washed in water, 20% sodium hydroxide and water again. The cross-linking is shown to be effective by insolubility of the fiber in toluene. The fiber also contained sulfonic acid groups in an amount of about five per ten aromatic nuclei and an appreciable amount of carboxyl groups.

Example 9

Filaments (stretched 400%) composed of a blend (having a $T_i$ well over 20° C.) of poly(styrene) (80% by weight) and poly(ethyl acrylate) (20% by weight) are stabilized by soaking in 96% sulfuric acid at 35° C. for 2 hours. Such treated fibers are insoluble in toluene.

Example 10

A five hundred-filament yarn, the filaments (stretched 300%) of which are composed of a blend (having a $T_1$ well over 20° C.) of 80% by weight poly(styrene) and a copolymer of poly(vinyl chloride) (90% by weight) and poly(diethyl maleate) (10% by weight), is stabilized by soaking in 96% sulfuric acid at 35° C. for 48 hours. The light tan product is quenched in 85% sulfuric acid, then washed in water, 20% sodium hydroxide and water again. The chlorine content of the fiber is reduced, while a small amount of sulfonic ion-exchange capacity is gained. Stabilization and cross-linking is demonstrated by low retraction and insolubility in toluene.

Example 11

Fibers (stretched 70%) of a copolymer (having a $T_1$ well over 20° C.) of styrene and maleic anhydride in 50:50 mole ratio are immersed in a 1.0 molar solution of aluminum chloride in nitromethane at ambient temperatures for 24 hours. The treated filaments are rinsed thoroughly with water and air-dried. The resulting fiber is cross-linked as evidenced by its insolubility in common organic solvents including toluene, xylene, and chlorobenzene.

Example 12

Fibers (stretched 100%) of a copolymer (having a $T_1$ well over 20° C.) of 90% styrene and 10% acrylyl chloride are immersed in a 1.0 molar solution of aluminum chloride in nitromethane at ambient temperatures for 24 hours. The treated filaments are rinsed thoroughly with water and air-dried. The resulting fiber is cross-linked as evidenced by its insolubility in common organic solvents including toluene, xylene, and chlorobenzene.

Example 13

Fibers (stretched 300%) formed of a blend (having a $T_1$ well over 20° C.) of 50 parts of polystyrene with 50 parts of a copolymer of 88% of styrene and 12% of methacrylic acid are treated in the manner described in Example 8. Stabilized, ion-exchange fibers are obtained.

Example 14

Fibers (stretched 300%) formed of a blend (having a $T_1$ well over 20° C.) of 50 parts of polystyrene with 50 parts of a copolymer of 50% styrene and 50% t-butyl acrylate are treated in the manner described in Example 8. Stabilized, ion-exchange fibers are obtained.

Example 15

Fibers (stretched 100%) of a copolymer (having a $T_1$ well over 20° C.) of 90% styrene and 10% acrylonitrile are immersed in a 1.0 molar solution of aluminum chloride in nitromethane at ambient temperatures for 24 hours. The treated filaments are rinsed thoroughly with water and air-dried. The resulting fiber is cross-linked as evidenced by its insolubility in common organic solvents including toluene, xylene, and chlorobenzene.

Example 16

Fibers (stretched 300%) formed of a blend (having a $T_1$ well over 20° C.) of 50 parts of polystyrene with 50 parts of a copolymer of 70% of vinyltoluene and 30% of ethyl acrylate are treated in the manner described in Example 8. Stabilized, ion-exchange fibers are obtained.

We claim:

1. As an article of manufacture, an artificial fiber formed from a polymeric material selected from the group consisting of (1) a blend of linear polymers comprising (A) a polymer of at least one monovinyl aromatic compound with (B) a linear polymer of at least one acyl member selected from the group consisting of monoethylenically unsaturated acids and the halides, anhydrides, nitriles, and esters of such acids, the blend having an apparent second order transition temperature of at least 20° C., the proportion of units in the polymer blend derived from an acyl member being about 2 to 30% by weight of the blend, and (2) an aryl/acyl copolymer (C) comprising polymerized units of at least one monovinyl aromatic compound with at least one of the aforesaid acyl members, the copolymer having an apparent second order transition temperature of at least 20° C. and the proportion of acyl member units being about 2 to 30% by weight of the copolymer, the linear polymer molecules in the fiber being oriented longitudinally of the axis of the fiber as a result of stretching of the fiber, while the polymer molecules of the fiber are still of linear character, at least 50% of the initial length of the fiber, the fiber being in a condition of stabilization wherein it is resistant to shrinkage on heating as a result exclusively of cross-linking ($a$) in the case of the blend, by acylation of aromatic nuclei of (A) above with polymerized units derived from an acyl member in (B) above, and ($b$) in the case of the copolymer, by acylation of aromatic nuclei of copolymer molecules by an acyl member of other copolymer molecules by an acyl member of other copolymer molecules.

2. As an article of manufacture, an artificial fiber formed from a blend of linear polymers comprising (A) a polymer of styrene and (B) a linear polymer of methacrylic acid, the blend having an apparent second order transition temperature of at least 20° C., the proportion of methacrylic acid units in the polymer blend being about 2 to 30% by weight of the blend, the linear polymers in the blend being oriented longitudinally of the axis of the fiber as a result of stretching of the fiber, while the polymers of the blend are still of linear character, at least 50% of the initial length of the fiber, the fiber being in a condition of stabilization wherein it is resistant to shrinkage on heating as a result exclusively of cross-linking by acylation of the aromatic nuclei of styrene with polymerized methacrylic acid units, said cross-linked fiber containing at least one sulfonic group per 10 aromatic nuclei in the fiber.

3. As an article of manufacture, an artificial fiber formed from a blend of linear polymers comprising (A) a polymer of styrene and (B) a linear polymer of t-butyl acrylate, the blend having an apparent second order transition temperature of at least 20° C., the proportion of t-butyl acrylate units in the polymer blend being about 2 to 30% by weight of the blend, the linear polymers in the blend being oriented longitudinally of the axis of the fiber as a result of stretching of the fiber, while the polymers of the blend are still of linear character, at least 50% of the initial length of the fiber, the fiber being in a condition of stabilization wherein it is resistant to shrinkage on heating as a result exclusively of cross-linking by acylation of the aromatic nuclei of styrene with polymerized t-butyl acrylate units, said cross-linked fiber containing at least one sulfonic group per 10 aromatic nuclei in the fiber.

4. As an article of manufacture, an artificial fiber formed from a blend of linear polymers comprising (A) a polymer of styrene and (B) a linear polymer of acrylonitrile, the blend having an apparent second order transition temperature of at least 20° C., the proportion of acrylonitrile units in the polymer blend being about 2 to 30% by weight of the blend, the linear polymers in the blend being oriented longitudinally of the axis of the fiber as a result of stretching of the fiber, while the polymers of the blend are still of linear character, at least 50% of the initial length of the fiber, the fiber being in a condition of stabilization wherein it is resistant to shrinkage on heating as a result exclusively of cross-linking by acylation of the aromatic nuclei of styrene with polymerized acrylonitrile units, said cross-linked fiber containing at least one sulfonic group per 10 aromatic nuclei in the fiber.

5. As an article of manufacture, an artificial fiber formed from a linear copolymer of at least one monovinyl aromatic compound and of an acyl member selected from the group consisting of monoethylenically unsaturated acids and the halides, anhydrides, nitriles, and esters of such acids, the copolymer having an apparent second order transition temperature of at least 20° C., the proportion of acyl units in the copolymer being about 2 to 30% by weight of the copolymer, the linear polymer molecules in the fiber being oriented longitudinally of the axis of the fiber as a result of stretching of the fiber, while the polymer molecules of the fiber are still of linear character, at least 50% of the initial length of the fiber, the fiber being in a condition of stabilization wherein it is resistant to shrinkage on heating as a result exclusively of cross-linking by acylation of aromatic nuclei of the copolymer with polymerized acyl units, said cross-linked fiber containing at least one sulfonic group per 10 aromatic nuclei in the fiber.

6. As an article of manufacture, an artificial fiber formed from a copolymer of styrene and of methacrylic acid, the copolymer having an apparent second order transition temperature of at least 20° C., the proportion of methacrylic acid units in the copolymer being about 2 to 30% by weight of the copolymer, the linear polymer molecules being oriented longitudinally of the axis of the fiber as a result of stretching of the fiber, while the polymer molecules of the fiber are still of linear character, at least 50% of the initial length of the fiber, the fiber being in a condition of stabilization wherein it is resistant to shrinkage on heating as a result exclusively of cross-linking by acylation of aromatic nuclei of styrene with polymerized methacrylic acid units, said cross-linked fiber containing at least one sulfonic group per 10 aromatic nuclei in the fiber.

7. As an article of manufacture, an artificial fiber formed from a copolymer of styrene and of t-butyl acrylate, the copolymer having an apparent second order transition temperature of at least 20° C., the proportion of t-butyl acrylate units in the copolymer being about 2 to 30% by weight of the copolymer, the linear polymer molecules being oriented longitudinally of the axis of the fiber as a result of stretching of the fiber, while the polymer molecules of the fiber are still of linear character, at least 50% of the initial length of the fiber, the fiber being in a condition of stabilization wherein it is resistant to shrinkage on heating as a result exclusively of cross-linking by acylation of aromatic nuclei of styrene with polymerized t-butyl acrylate units, said cross-linked fiber containing at least one sulfonic group per 10 aromatic nuclei in the fiber.

8. As an article of manufacture, an artificial fiber formed from a copolymer of styrene and of acrylonitrile, the copolymer having an apparent second order transition temperature of at least 20° C., the proportion of acrylonitrile units in the copolymer being about 2 to 30% by weight of the copolymer, the linear polymer molecules being oriented longitudinally of the axis of the fiber as a result of stretching of the fiber, while the polymer molecules of the fiber are still of linear character, at least 50% of the initial length of the fiber, the fiber being in a condition of stabilization wherein it is resistant to shrinkage on heating as a result exclusively of cross-linking by acylation of aromatic nuclei of styrene with polymerized acrylonitrile units, said cross-linked fiber containing at least one sulfonic group per 10 aromatic nuclei in the fiber.

9. As a composition of matter, a cross-linked polymeric substance formed from a polymeric material selected from the group consisting of (1) a blend of linear polymers comprising (A) a polymer of at least one monovinyl aromatic compound with (B) a linear polymer of at least one acyl member selected from the group consisting of monoethylenically unsaturated acids and the halides, anhydrides, nitriles, and esters of such acids, the blend having an apparent second order transition temperature of at least 20° C., the proportion of units in the polymer blend derived from an acyl member being about 2 to 30% by weight of the blend, and (2) an aryl/acyl copolymer (C) comprising polymerized units of at least one monovinyl aromatic compound with at least one of the aforesaid acyl members, the copolymer having an apparent second order transition temperature of at least 20° C. and the proportion of acyl member units being about 2 to 30% by weight of the copolymer, the polymeric substance being resistant to solvents and to shrinkage on heating as a result exclusively of cross-linking (a) as in the case of the blend, by acylation of aromatic nuclei of (A) above with polymerized units derived from an acyl member in (B) above, and (b) in the case of the copolymer, by acylation of aromatic nuclei of copolymer molecules by an acyl member of other copolymer molecules.

10. A composition of matter as defined in claim 9 in which the polymeric substance contains at least one sulfonic group per 10 aromatic nuclei therein.

11. As a composition of matter, a cross-linked polymeric substance formed from a polymeric material selected from the group consisting of a blend of linear polymers comprising (A) a polymer of at least one monovinyl aromatic compound with (B) a linear polymer of at least one acyl member selected from the group consisting of monoethylenically unsaturated acids and the halides, anhydrides, nitriles, and esters of such acids, the blend having an apparent second order transition temperature of at least 20° C., the proportion of units in the polymer blend derived from an acyl member being about 2 to 30% by weight of the blend, the polymeric substance being resistant to solvents and to shrinkage on heating as a result exclusively of cross-linking of the polymers in the blend by acylation of aromatic nuclei of (A) above with polymerized units from an acyl member in (B) above.

12. As a composition of matter, a cross-linked polymeric substance formed from a linear copolymer of at least one monovinyl aromatic compound and of an acyl member selected from the group consisting of monoethylenically unsaturated acids and the halides, anhydrides, nitriles, and esters of such acides, the copolymer having an apparent second order transition temperature of at least 20° C., the proportion of acyl units in the copolymer being about 2 to 30% by weight of the copolymer, the polymeric substance being resistant to solvents and to shrinkage on heating as a result exclusively of cross-linking by acylation of aromatic nuclei of the copolymer with polymerized acyl units thereof.

References Cited in the file of this patent

UNITED STATES PATENTS

| | | |
|---|---|---|
| 2,403,464 | Smith | July 9, 1946 |
| 2,405,008 | Berry et al | July 30, 1946 |
| 2,420,565 | Rugeley et al | May 13, 1947 |
| 2,548,853 | Baker | Apr. 17, 1951 |
| 3,014,776 | Mecco | Dec. 26, 1961 |

UNITED STATES PATENT OFFICE
CERTIFICATE OF CORRECTION

Patent No. 3,111,362            November 19, 1963

Fabian T. Fang et al.

It is hereby certified that error appears in the above numbered patent requiring correction and that the said Letters Patent should read as corrected below.

Column 8, lines 23 and 24, strike out "by an acyl member of other copolymer molecules".

Signed and sealed this 28th day of April 1964.

(SEAL)
Attest:

ERNEST W. SWIDER

Attesting Officer

EDWARD J. BRENNER

Commissioner of Patents